(12) United States Patent
Abe et al.

(10) Patent No.: US 9,336,581 B2
(45) Date of Patent: May 10, 2016

(54) METHOD FOR CORRECTING GRADATIONS AND DEVICE OR METHOD FOR DETERMINING THRESHOLD OF EPSILON FILTER

(71) Applicant: EIZO Corporation, Ishikawa (JP)

(72) Inventors: Reo Abe, Ishikawa (JP); Masashi Nakao, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 0 days.

(21) Appl. No.: 14/389,611

(22) PCT Filed: Oct. 9, 2012

(86) PCT No.: PCT/JP2012/076108
§ 371 (c)(1),
(2) Date: Jan. 14, 2015

(87) PCT Pub. No.: WO2013/145388
PCT Pub. Date: Oct. 3, 2013

(65) Prior Publication Data
US 2015/0117775 A1    Apr. 30, 2015

(30) Foreign Application Priority Data
Mar. 30, 2012    (JP) .................................. 2012-079738

(51) Int. Cl.
*G06K 9/00*    (2006.01)
*G06T 5/10*    (2006.01)
(Continued)

(52) U.S. Cl.
CPC . *G06T 5/10* (2013.01); *G06T 5/008* (2013.01); *G06T 5/20* (2013.01); *G09G 5/02* (2013.01);
(Continued)

(58) Field of Classification Search
USPC ......... 382/167, 162, 173, 175, 176, 218, 274, 382/312; 345/87, 204, 590, 604, 589, 690, 345/694; 348/222.1, 229.1, 294, 255, 679, 348/E5.133; 358/1.9
See application file for complete search history.

(56) References Cited

U.S. PATENT DOCUMENTS 6,636,635 B2 * 10/2003 Matsugu .................. G06K 9/20 382/218
6,993,184 B2 * 1/2006 Matsugu .................. G06K 9/20 382/173
(Continued)

FOREIGN PATENT DOCUMENTS

EP    2061233 A1    5/2009
JP    09-051532 A    2/1997
(Continued)

OTHER PUBLICATIONS

International Search Report dated Jan. 8, 2013 from corresponding International Patent Application No. PCT/JP2012/076108; 4 pgs.
(Continued)

*Primary Examiner* — Anh Do
(74) *Attorney, Agent, or Firm* — Maier & Maier, PLLC

(57) ABSTRACT

An object is to correct gradations in such a manner that both halo reduction effect and Retinex calculation effect are satisfied. Each JND value corresponding to each obtained luminance value to be assigned to each unit gradation of a panel is obtained. A pixel value corresponding to the each JND value is obtained for each of the unit gradations of the panel. A threshold $\epsilon$ is obtained by inverse gamma-correcting the ratio between discernible JND values corresponding to the unit gradations of the panel and the maximum output value of the panel. Linear function-based approximations are obtained using least squares. The threshold $\epsilon$ is determined as an increasing function of a pixel value on the basis of the allowable number of JND steps. The threshold $\epsilon$ is changed using this function. The threshold $\epsilon$ can be changed according to the center pixel value.

12 Claims, 9 Drawing Sheets

(51) Int. Cl.
*G09G 5/02* (2006.01)
*H04N 1/407* (2006.01)
*G06T 5/00* (2006.01)
*H04N 5/202* (2006.01)
*G06T 5/20* (2006.01)

(52) U.S. Cl.
CPC ............... *H04N 1/407* (2013.01); *H04N 5/202* (2013.01); *G09G 2360/144* (2013.01); *G09G 2360/16* (2013.01)

(56) References Cited

U.S. PATENT DOCUMENTS

| | | |
|---|---|---|
| 2003/0156761 A1 | 8/2003 | Ogata et al. |
| 2006/0114993 A1 | 6/2006 | Xiong et al. |
| 2007/0237418 A1 | 10/2007 | Toyoda et al. |
| 2008/0050031 A1 | 2/2008 | Itoh et al. |
| 2008/0101719 A1 | 5/2008 | Lim et al. |
| 2009/0059026 A1 | 3/2009 | Katagiri et al. |
| 2009/0245679 A1 | 10/2009 | Ohwaki et al. |
| 2010/0020205 A1 | 1/2010 | Ishida et al. |
| 2010/0310189 A1 | 12/2010 | Wakazono et al. |

FOREIGN PATENT DOCUMENTS

| | | | | |
|---|---|---|---|---|
| JP | EP 1235427 | * | 8/2002 | ............... H04N 5/57 |
| JP | 2003-008935 A | | 1/2003 | |
| JP | 2006-060792 A | | 3/2006 | |
| JP | 2007-281767 A | | 10/2007 | |

OTHER PUBLICATIONS

Kazuchika Sato et al.; "Contrast Improvement for Linear/Log CMOS Image Sensor"; Konica Minolta Technology Report vol. 4 (2007); pp. 82-87; 6 pgs.

Australian Office Action dated Jun. 29, 2015 from corresponding Australian Application No. 2012374716; 7 pgs.

Michifumi Yoshioka et al.; "Face Image Make-Up System by Using an ϵ-Filter"; Artif Life Robotics (2010); vol. 15, pp. 203-206; ISAROB 2010; 5 pgs.

Extended European Search Report dated Nov. 18, 2015, including the Supplementary European Search Report and the European Search Opinion, in connection with EP Application No. 12872830.0 (10 pgs.).

Masami Ogata, et al., "Dynamic Range Compression Based on Illumination Compensation", in IEEE Transaction on Consumer Electronics, vol. 47, No. 3, Aug. 2001, pp. 548-558 (11 pgs.).

Doo Hyun Choi, et al., "Color Image Enhancement Using Single-Scale Retinex Based on an Improved Image Formation Model", paper from the 16th European Signal Processing Conference (EUSIPCO 2008), Lausanne, Switzerland, Aug. 25-29, 2008, 5 pgs.

* cited by examiner

METHOD FOR CORRECTING GRADATIONS AND DEVICE OR METHOD FOR DETERMINING THRESHOLD OF EPSILON FILTER

TECHNICAL FIELD

The present invention relates to Retinex processing and in particular to gradation correction where reduction of halo artifacts and Retinex processing are in balance.

BACKGROUND ART

Retinex processing is known as a method for compressing dynamic range through image processing. Retinex processing includes separating the original image into a reflected-light component and an illumination light component by using a low-pass filter, correcting the illumination light component, and outputting a combination of the corrected illumination light component and the reflected-light component.

While the edges are favorably reproduced when a small-sized low-pass filter is used, halo artifacts may occur around the edges when a large-sized low-pass filter is used.

Edge-preserving low-pass filters have been proposed to prevent halo artifacts, and ε filters are known as one type of such low-pass filters. For ε filters, a threshold ε is previously set, and of all pixels in a predetermined region, only pixels having values whose difference with that of the center pixel in the region falls within the threshold ε are used as the subject of calculation.

While lowering the threshold ε allows reducing halo artifacts, a Retinex processing effect, stereoscopic vision, is lost.

As seen above, it has been difficult to control halo artifacts to the extent that no halo artifacts can be visually recognized while maintaining low-pass filter effects.

Patent Document 1 discloses a technology which changes the threshold ε by using the edge strength in the target region. However, this technology only notes the edges around which halo artifacts may occur to determine the threshold ε.

PRIOR ART DOCUMENTS

Patent Documents

Non-Patent Document 1: KONICA MINOLTA TECHNOLOGY REPORT VOL. 4, "Image Processing for Increasing Contrast of Wide-Dynamic-Rage Image" http://www.konicaminoltajp/about/research/technology_report/2007/pdf/introduce_011.pdf
Patent Document 1: Japanese Unexamined Patent Application Publication No. 2003-8935

SUMMARY OF THE INVENTION

Problems to be Solved by the Invention

The present invention has been made to solve the above problem, and an object thereof is to provide an epsilon-filter threshold determination device or method and gradation correction method which are based on visibility characteristics and/or consider the influence of ambient light.

Means for Solving the Problems (1) A method for correcting gradations of the present invention is a method for correcting gradations on the basis of Retinex theory in a display device and comprises:

obtaining each assignment luminance value to be assigned to each processing unit gradation, on the basis of the maximum and minimum luminance values of each display device;

determining thresholds of an epsilon filter such that the thresholds have a monotone increasing relationship with the assignment luminance values, on the basis of respective discernible luminance values corresponding to the respective processing unit gradations; and when input image data of a predetermined region is provided to the epsilon filter, correcting gradations using the threshold of the epsilon filter corresponding to a center representative value of the input image data.

Since the thresholds of the epsilon filter corresponding to the respective processing unit gradations are determined as seen above, gradations can be properly corrected for each region. Further, since the discernible luminance differences are determined based on the data on the discernible luminance differences corresponding to the luminance values, gradations can be corrected according to the discerning ability of a human.

(2) In the method of the present invention, the each assignment luminance value corresponding to the each processing unit gradation is obtained on the basis of the maximum and minimum luminance values, as well as ambient light. Thus, gradations can be corrected considering the ambient light.

(3) In the method of the present invention, a formula representing a relationship between the processing unit gradations and the thresholds of the epsilon filter is dynamically changed based on ambient light detected by ambient light detection means. Thus, even when the ambient light is changed, gradations can be corrected according to the change in ambient light.

(4) A device for correcting gradations of the present invention is a device for correcting gradations on the basis of Retinex theory in a display device and comprises: an extraction unit configured to, when receiving a predetermined region of input image data to be inputted to an epsilon filter, extract a center representative value located around the center of an adjacent pixel region, the center representative value being to be used when the epsilon filter performs a calculation;

a threshold determination unit storing correspondences between the center representative value and the threshold of the epsilon filter and configured to, when receiving the center representative value, determine a corresponding threshold on the basis of the correspondences;

an epsilon filter configured to smooth the inputted predetermined region of input image data using the threshold determined by the threshold determination unit;

a gradation correction unit configured to correct gradations using an output value of the epsilon filter as an illumination light component.

Since the thresholds of the epsilon filter corresponding to the respective processing unit gradations are changed using the center representative value as seen above, gradations can be properly corrected for each region. Further, since the discernible luminance differences are determined based on the data on the discernible luminance differences corresponding to the luminance values, gradations can be corrected according to the discerning ability of a human.

(5) A device for determining a threshold of an epsilon filter according to the present invention comprises: an extraction unit configured to extract a center representative value located around the center of an adjacent pixel region, the center representative value being to be used when the epsilon filter performs a calculation; and a threshold determination unit storing correspondences between the center representative value and the threshold of the epsilon filter and configured to, when receiving the center representative value, determine a corresponding threshold on the basis of the correspondences, wherein the correspondences between the center representative value and the threshold of the epsilon filter represent a monotone increasing relationship determined based on a discernible luminance difference corresponding to a particular luminance value.

Thus, the threshold can be changed so that it is raised when the center representative value is large and it is lowered when the center representative value is small. Thus, ϵ can be properly calculated for each region.

(6) In the method for determining a threshold of an epsilon filter according to the present invention, the center representative value is luminance of a center pixel in the adjacent pixel region. Thus, the adjacent pixels used when the epsilon filter performs a calculation can be dynamically changed based on the center representative value.

(7) In the device for determining a threshold of an epsilon filter according to the present invention, the correspondences between the center representative value and the threshold of the epsilon filter is represented by a formula below.

$$\epsilon = (\text{center representative value} * \alpha) + \beta$$

where $\alpha$ and $\beta$ each represent a decimal fraction between 0 and 1, and the center representative value is normalized to 0 to 1.

Thus, the adjacent pixels used when the epsilon filter performs a calculation can be dynamically changed based on the pixel characteristics of the region.

(8) The device for determining a threshold of an epsilon filter according to the present invention further comprises an ambient light detection unit configured to detect ambient light, wherein the threshold determination unit stores a plurality of correspondences between the center representative value and the threshold of the epsilon filter, the correspondences corresponding to values of the ambient light, and selects one of the correspondences on the basis of the detected ambient light and outputs a corresponding threshold. For this reason, the threshold can be changed according to changes in ambient light.

(9) A method for determining a threshold of an epsilon filter according to the present invention comprises: obtaining each discernible luminance difference corresponding to each processing unit gradation with respect to each assignment luminance value assigned to the each processing unit gradation, on the basis of data on discernible luminance differences corresponding to luminance values; and determining the assignment luminance values and the threshold in such a manner that the assignment luminance values and the thresholds have a monotone increasing relationship with a center representative value provided to the epsilon filter, on the basis of the respective discernible luminance differences corresponding to the respective processing unit gradations.

Thus, the threshold can be changed so that it is raised when the center representative value is large and it is lowered when the center representative value is small. As a result, the threshold can be changed so that the threshold of the high-luminance region, where humans are less likely to perceive halo artifacts, is raised and the threshold of the low-luminance region, where humans are likely to perceive halo artifacts, is lowered.

(10) A method for correcting gradations according to the present invention comprises:

obtaining each assignment luminance value to be assigned to each processing unit gradation, on the basis of the maximum and minimum luminance values of each display device;

obtaining each discernible luminance difference corresponding to the each assignment luminance value on the basis of data on discernible luminance differences corresponding to luminance values;

obtaining each normalized discernible luminance difference corresponding to the each processing unit gradation by normalizing the obtained discernible luminance differences using a difference between the maximum and minimum values of the display device;

obtaining thresholds of an epsilon filter corresponding to the respective processing unit gradations on the basis of the normalized discernible luminance differences; and when input image data of a predetermined region is provided to the epsilon filter, correcting gradations using the threshold of the epsilon filter corresponding to a center representative value of the input image data.

Since the normalized discernible luminance differences are used as the thresholds of the epsilon filter corresponding to the processing unit gradations as seen above, gradations can be properly corrected for each region. Further, since the discernible luminance differences are determined based on the data on the discernible luminance differences corresponding to the luminance values, gradations can be corrected according to the discerning ability of a human.

While the V value in HSV color space is used as the "luminance" in the present description, not only the V value but also changes in luminance caused by the backlight and/or ambient illumination light or the like may be considered.

The "center representative value" refers to a brightness value obtained around the center pixel in the adjacent pixel region of the epsilon filter. While luminance is used as a measure of brightness in an embodiment below, other measures may be used. While the luminance of the center pixel is used in the embodiment below, not only the luminance of the center pixel but also that of pixels adjacent to the center pixel may be considered. The average may be obtained by weighted averaging rather than simple averaging.

The "discernible luminance differences corresponding to the respective luminance values" refer to luminance differences which an average observer can just (at least) discern and is a concept including "just-noticeable difference (JND)".

The "JND index (hereafter referred to as "JNDI") is a perception index which is required to allow one step of JNDI to result in a luminance difference serving as a JND. That is, the JNDI refers to an index which an average observer perceives as "brightness" of equal intervals. In Digital Imaging and Communications in Medicine (DICOM) (PS 3.14-1999; volume 14), the JNDI is defined as a gray scale standard display function (GSDF) using the Barten model.

The "determine an allowable value using a JND as a reference" refers to the allowable number of JNDs, each representing a discernible luminance difference. While the allowable number is set to 10 JNDs in the embodiment below, other numbers may be used.

The "unit gradation" refers to one unit included in the gradations. For example, a unit gradation is one of 256 gradations. The "processing unit gradation" refers to a gradation(s) which corresponds to the ϵ value in this description. While the processing unit gradation is one unit gradation in the embodiment below, it may be multiple unit gradations.

The "monotone increasing relationship" is a concept including not only linear shapes as shown in the embodiment but also non-linear shapes as shown in FIG. 3B.

EMBODIMENTS

An embodiment of the present invention will be described with reference to the drawings.

1. Outline

Figure 1:
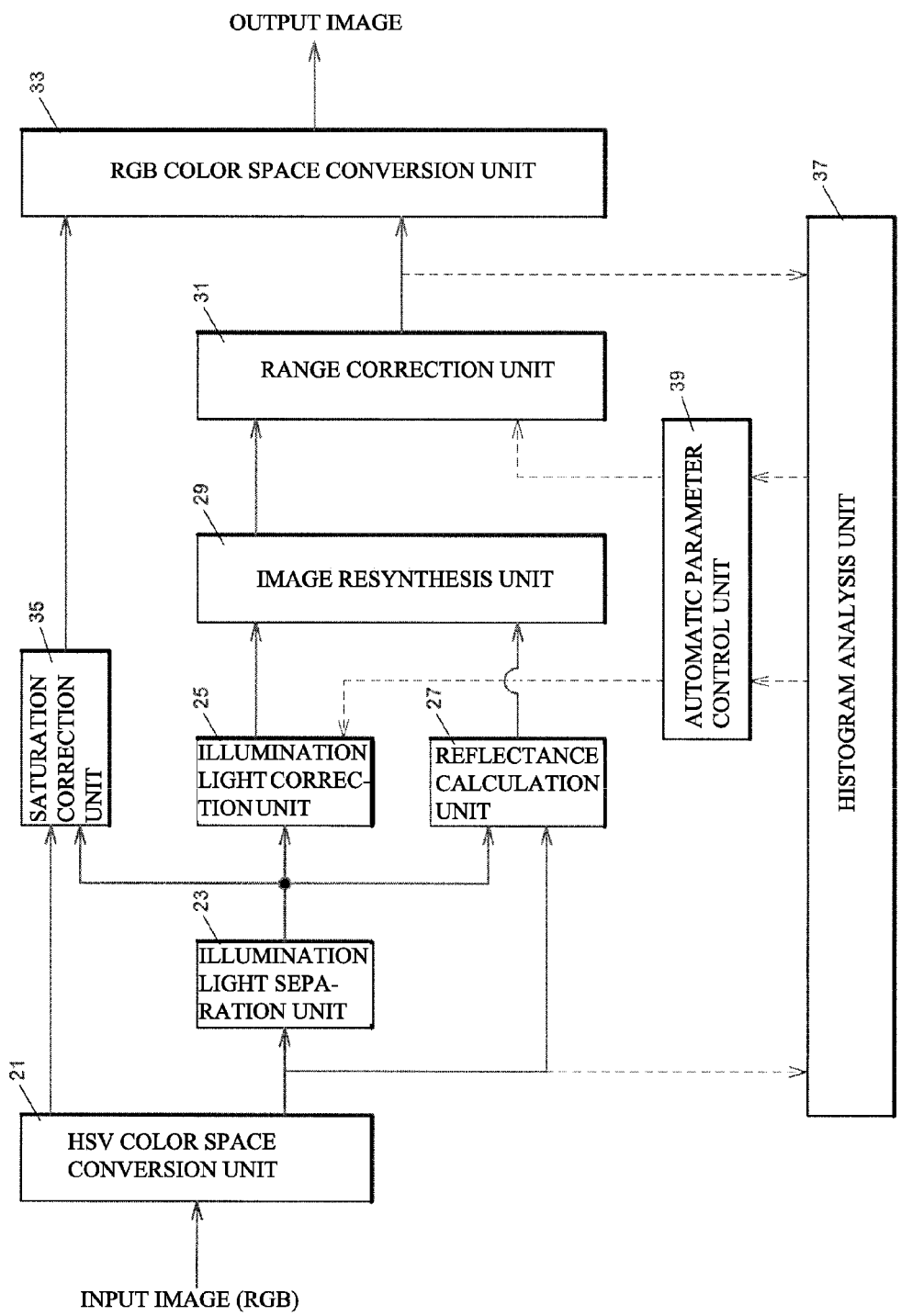
FIG. 1 is a block diagram of an image gradation adjustment device.

FIG. 1 shows a schematic diagram of an image gradation adjustment device including a gradation correction device according to the present embodiment. In the present embodiment, an illumination light separation unit 23 serves as a gradation correction device.

An HSV color space conversion unit 21 converts RGB color space into HSV color space. The HSV color space is converted into the RGB color space using a typical conversion formula. Use of HSV color space allows elimination of saturation reduction effects resulting from the adjustment of brightness using YUV color space and thus visually favorable correction of brightness.

The illumination light separation unit 23 is an edge-preserving low-pass filter (LPF) and calculates the weighted average of local brightness, that is, the illumination light component. A histogram analysis unit 37 generates a 32-step gradation histogram on the basis of the V components of the input image and output image in HSV space and calculates the feature value of the entire image. An automatic parameter control unit 39 determines the parameter of the corrected amount of illumination light on the basis of the feature value of the image obtained from the histogram analysis.

An illumination light correction unit 25 corrects the low-gradation region of the illumination light component on the basis of the parameter value of the corrected amount of illumination light provided by the automatic parameter control unit 39 and the illumination light component L provided by the illumination light separation unit 23.

The reflectance calculation unit 27 calculates reflectance from the logarithmic difference between the illumination light component obtained by the illumination light separation unit 23 and reflected-light component (input V values) and outputs the reflectance.

An image resynthesis unit 29 calculates a corrected image from the corrected illumination light component calculated by the illumination light correction unit 25 and the reflectance component (the reflectance) calculated by the reflectance calculation unit 27. A range correction unit 31 corrects the V component range of the image on the basis of the parameter value of the amount of range correction. While the illumination light correction unit 25 corrects local brightness, the range correction unit 31 corrects the brightness of the entire image. Thus, the contrast of the entire image can be optimized.

The histogram analysis unit 37 generates a 32-step gradation histogram from the V value corrected by the range correction unit 31, calculates the feature value of the entire image, and provides the feature value to the automatic parameter control unit 39. The automatic parameter control unit 39 determines the parameter of the amount of range correction on the basis of the feature value provided.

A saturation correction unit 35 corrects the saturation of the low-gradation region. In the present embodiment, the saturation correction unit 35 selects between enhancement and reduction to correct the saturation of the low-gradation region.

An RGB color space conversion unit 33 converts the HSV color space into the RGB color space.

2. Details

Figure 2:
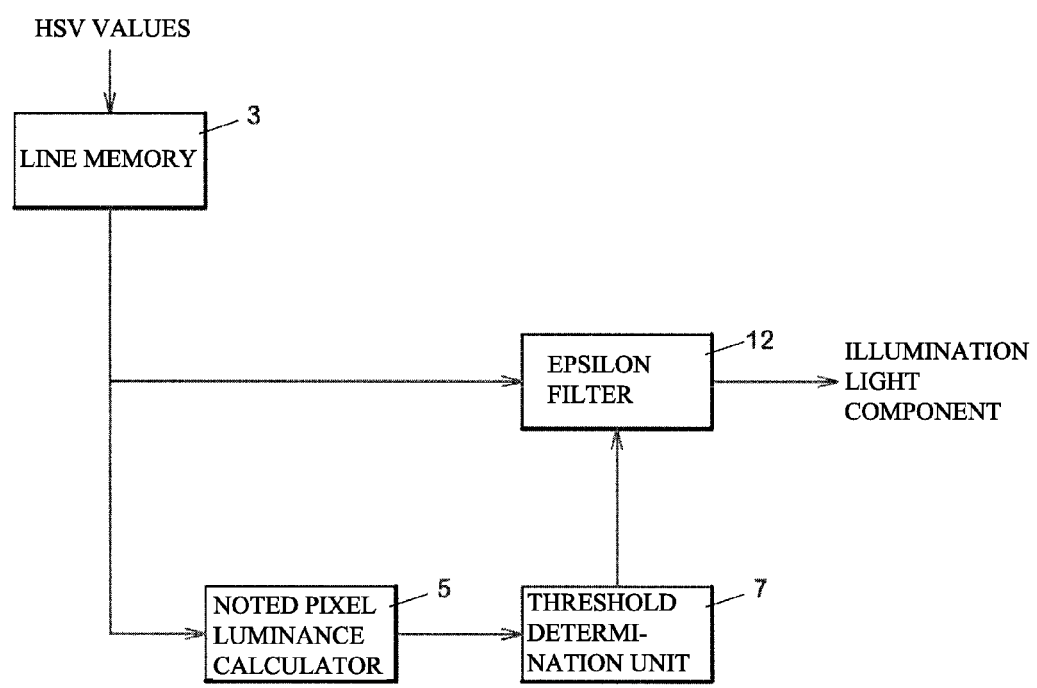
FIG. 2 is a detailed block diagram of an illumination light separation unit 23.

Referring to FIG. 2, details of the illumination light separation unit 23 will be described.

A line memory 3 stores HSV input values and outputs the HSV values of an extraction range which is composed of M*M pixels centered on the target pixel. A noted pixel luminance calculator 5 extracts the center representative value of the extraction range and provides it to a threshold determination unit 7. In the present embodiment, the V value of the center pixel in the extraction range is used as it is as the center representative value.

The threshold determination unit 7 receives the center representative value and determines a threshold $\epsilon$ using Formula (1) below.

[Formula 1]

Threshold $\epsilon$=(center representative value*$\alpha$)+$\beta$   Formula (1)

Since the center representative value is the V value of HSV color space, it takes a value from 0 to 1. In the present embodiment, it is assumed that $\alpha$=0.7 and $\beta$=0.3. This will be described later.

An epsilon filter 12 extracts only pixels having values whose difference with that of the target center pixel is smaller than $\epsilon$, by using the V value of the M*M pixels provided by the line memory 3 and the threshold $\epsilon$ provided by the threshold determination unit 7, and then filters the pixels extracted.

The significance of Formula (1) above will be described.

JND is known as a threshold which allows humans to discern the difference between luminance values. When the luminance difference is smaller than the value of JND (hereafter referred to as "JND value"), humans hardly discern the difference in luminance between the multiple pixels. The JND value is small when the luminance values are low; it is large when the luminance values are high. This is because humans have visual characteristics in which they are sensitive to the luminance difference when the luminance values are low and where they are insensitive to it when the luminance values are high.

The inventors thought that when they obtained a JND value corresponding to the pixel luminance for each of unit gradations determined based on optical characteristics of each device and determined the relationship between the center representative value and threshold $\epsilon$ on the basis of the JND values obtained, reduction of halo artifacts and Retinex processing-based correction could be in balance.

Details are described below. For example, assume that the liquid crystal and backlight have optical characteristics: the maximum luminance of the panel Lmax=300 [cd/m^2]; the minimum luminance of the panel Lmin=0.1 [cd/m^2]; gamma=2.2; the intensity of the backlight BL=1 (normalized to 0 to 1); and the surface reflection luminance of the panel (ambient light) Latm=30 [cd/m^2]. The gradation of the panel (X) (normalized to 0 to 1) and luminance L corresponding to each unit gradation are obtained using Formula (2) below.

[Formula 2]

$$L = BL*(Lmax - Lmin)*(X)^{2.2} + Lmin + Latm \quad \text{Formula (2)}$$

FIG. 3A shows the correspondences between the obtained unit gradations (X) (0 to 1) of the panel and luminance values L.

Next, JND values (discernible luminance differences) corresponding to the obtained luminance values are obtained.

As seen above, with respect to the luminance value corresponding to each unit gradation, the difference between a luminance value corresponding to the JNDI of the luminance value and a luminance value corresponding to the next JNDI is calculated. Thus, discernible luminance differences corresponding to the unit gradations (X) (0 to 1) of the panel are obtained.

In the present embodiment, JNDIs corresponding to the luminance values are obtained using Formula (3), and luminance values corresponding to the JNDIs are obtained using Formula (4).

[Formula 3]

$$\text{Luminance} \rightarrow \text{JNDI } j(L) = A + B \cdot \text{Log}_{10}(L) + C \cdot (\text{Log}_{10}(L))^2 + D \cdot (\text{Log}_{10}(L))^3 + E \cdot (\text{Log}_{10})^4 + F \cdot (\text{Log}_{10}(L))^5 + G \cdot (\text{Log}_{10}(L))^6 + H \cdot (\text{Log}_{10}(L))^7 + I \cdot (\text{Log}_{10}(L))^8 \quad (3)$$

A=71.498068, B=94.593053, C=41.912053, D=9.8247004
E=0.28175407, F=−1.1878455, G=−0.18014349, H=0.14710899
I=−0.017046845

The JNDI-to-luminance value L relationship can be obtained using the exponent of 10 on the basis of the value of the formula below.
This relationship is expressed as j2v(JNDI).

[Formula 4]

$$\text{JNDI} \rightarrow \text{Luminance} \quad (4)$$

$$\log_{10} L(j) = \frac{a + c \cdot \text{Ln}(j) + e \cdot (\text{Ln}(j))^2 + g \cdot (\text{Ln}(j))^3 + m \cdot (\text{Ln}(j))^4}{1 + b \cdot \text{Ln}(j) + d \cdot (\text{Ln}(j))^2 + t \cdot (\text{Ln}(j))^3 + h \cdot (\text{Ln}(j))^4 + k \cdot (\text{Ln}(j))^6}$$

$j = 1$ to $1023$
$a = -1.3011877$,
$b = -2.5840191E - 2$,
$c = 8.0242636E - 2$,
$d = -1.0320229E - 1$,
$e = 1.3646699E - 1$,
$f = 2.8745620E - 2$,
$g = -2.5468404E - 2$,
$h = -3.1978977E - 3$,
$k = 1.2992634E - 4$,
$m = 1.3635334E - 3$

Here, the difference between a luminance value corresponding to the target JNDI and a luminance value corresponding to the next JNDI, that is, a JND value of the target luminance value is obtained using Formula (5) below.

[Formula 5]

$$\text{JND value} = j2v(\text{JND\_INDEX}+1) - j2v(\text{JND\_INDEX}) \quad \text{Formula (5)}$$

Various mathematical models are proposed as models related to JND or JNDI: Barten model, Weber model (applicable to the medium-luminance region), DeVries-Rose model (applicable to the low-luminance region), T.Ji model, and the like. The Barten model is a visual, physiological model constructed using a mathematical description. Approximate formulas made by Blume and others can be used as formulas for converting the luminance into Barten-JNDI. A JNDI may be obtained using a mathematical model or may be a value found experimentally or empirically through a sensory evaluation or the like. Not only a particular JNDI but also a model which is more suitable for visual characteristics may be used.

FIG. 3B shows JND values (luminance differences) corresponding to the unit gradations.

Next, a pixel value corresponding to the JND value is obtained for each unit gradation of the panel, and the pixel values obtained are used as thresholds $\epsilon$ corresponding to the unit gradations. In the present embodiment, unit gradations of the panel corresponding to the JND values are obtained using Formulas (6) and (7) below.

[Formula 6]

$$\epsilon\_\text{luminance} = \text{JND}/(L\max - L\min) \quad \text{Formula (6)}$$

[Formula 7]

$$\epsilon = \epsilon\_\text{luminance}^{(1/2.2)} \quad \text{Formula (7)}$$

Note that the above conversion is that when an optical characteristic of the panel, $\gamma$, is 2.2. The value of $\gamma$ is not limited thereto.

As seen above, the ratios between the discernible JND values corresponding to the unit gradations (X) (0 to 1) of the panel and the maximum output value of the panel are inverse-gamma corrected to obtain the thresholds $\epsilon$. Thus, a relationship as shown in FIG. 3C is obtained.

FIG. 3D shows linear function-based approximations calculated from FIG. 3C using least squares.

When one JND is allowed in the above environment, linear functions $\alpha$, $\beta$ showing the relationship between the thresholds $\epsilon$ and the luminance values corresponding to the unit gradations are set to 0.071 and 0.031, respectively.

Use of these values allows reliable elimination of halo artifacts in each region.

In the present embodiment, however, 10 JNDs are allowed, since when only a few halo artifacts are left, gradations can be corrected in such a manner that stereoscopic vision is obtained. This will be described later. For this reason, $\alpha$ and $\beta$ are set to 0.7 and 0.3, respectively.

While the smoothing process in the epsilon filter 12 shown in FIG. 2 is similar to the conventional smoothing process, a weighted average is obtained using Formula (8) below in the present embodiment.

[Formula 8]

$$Y_s = \frac{\sum_{i,j} f(x_{i,j}) * F_{i,j}}{\sum_{i,j} k(x_{i,j}) * F_{i,j}} \quad (8)$$

In Formula 8, Σ represents calculations on the entire block of pixels (e.g., M*M pixels) corresponding to the size of the low-pass filter, and f(x) and k(x) are represented by Formulas (9) and (10), respectively.

[Formula 9]

$$f(x_{i,j})=(|x_{i,j}-\text{CENTER}|<\text{DELTA})?x_{i,j}:0 \qquad (9)$$

[Formula 10]

$$k(x_{i,j})=(|x_{i,j}-\text{CENTER}|<\text{DELTA})?1:0 \qquad (10)$$

That is, when the absolute value of the difference between the luminance of a pixel $x_{i,j}$ and the luminance of a center pixel CENTER is smaller than the threshold, $f(x_{i,j})$ becomes the luminance of the pixel $x_{i,j}$; otherwise, $f(x_{i,j})$ becomes 0.

Further, when the absolute value of the difference between the luminance of the pixel $x_{i,j}$ and the luminance of the center pixel CENTER is smaller than the threshold, $k(x_{i,j})$ becomes 1; otherwise, $k(x_{i,j})$ becomes 0. Accordingly, the low-pass filter does not perform calculations on the pixel $x_{i,j}$.

Note that in Formula (8), $f(x_{i,j})*F_{i,j}$ and $k(x_{i,j})*F_{i,j}$ represent convolutions. The Gaussian filter coefficient $F_{(i,j)}$ may be set freely.

As seen above, in the present embodiment, the threshold ϵ is a variable value which is changed according to the center representative value of the extraction range, as shown in Formula (1). That is, the ϵ Gaussian filter used in the present embodiment can be said to be an adaptive ϵ Gaussian filter which uses the center representative value.

Hereafter, effects when the threshold ϵ is changed according to the center representative value will be described with reference to FIGS. 4 to 8.

FIGS. 4 to 8 are graphs showing an input pixel value I, the illumination light component L (the output value of the ϵ filter), reflectance R (=I/L), a corrected illumination light component L', or an output pixel value I' (=RL') when the threshold ϵ is changed. The horizontal axis represents the pixel position, and the vertical axis represents the pixel value. Note that while the values are shown one-dimensionally in these graphs, they can be shown two-dimensionally. In FIGS. 4 to 8, for the input pixel value I, pixel positions 0 to 350 include alternating-current components. In particular, the pixel positions 50 to 100, 150 to 200, and 250 to 300 include large alternating-current components. Further, the pixel positions 50 to 100, 150 to 200, and 250 to 300 include alternating-current components having larger amplitude as the adjacent luminance value is higher. The largest amplitude exists around the pixel positions 50 to 100. Even in this case, use of the filter which uses JNDs to change the threshold allows effective separation of the alternating-current component (reflectance component) and direct-current component (illumination light component).

Figure 4:
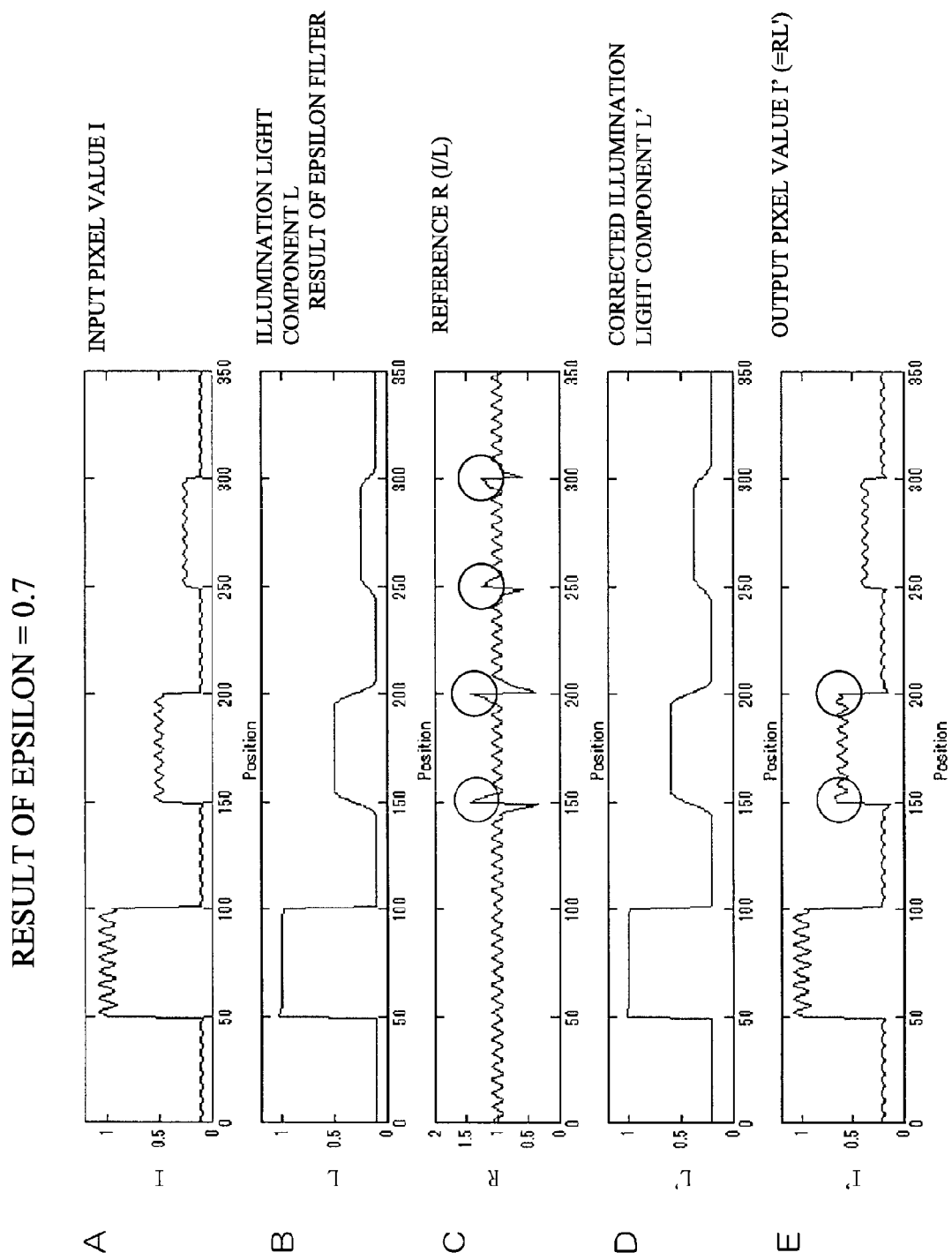
FIG. 4 includes graphs showing input/output data when a threshold $\epsilon$=0.7.

FIG. 4 shows a case where the threshold ϵ is 0.7 (fixed value). For the illumination light component L, as shown in FIG. 4B, almost all the alternating-current component is eliminated from the pixel positions 50 to 100, 150 to 200, and 250 to 300. For the reflectance R, on the other hand, as shown in FIG. 4C, no ripples occur at the edges of the pixel positions 50 to 100, while ripples occur at the edges of the pixel positions 150 to 200 and 250 to 300. As a result, as shown in FIG. 4E, halo artifacts on portions having the largest luminance difference are reduced, while halo artifacts occur on portions having small luminance differences.

Figure 5:
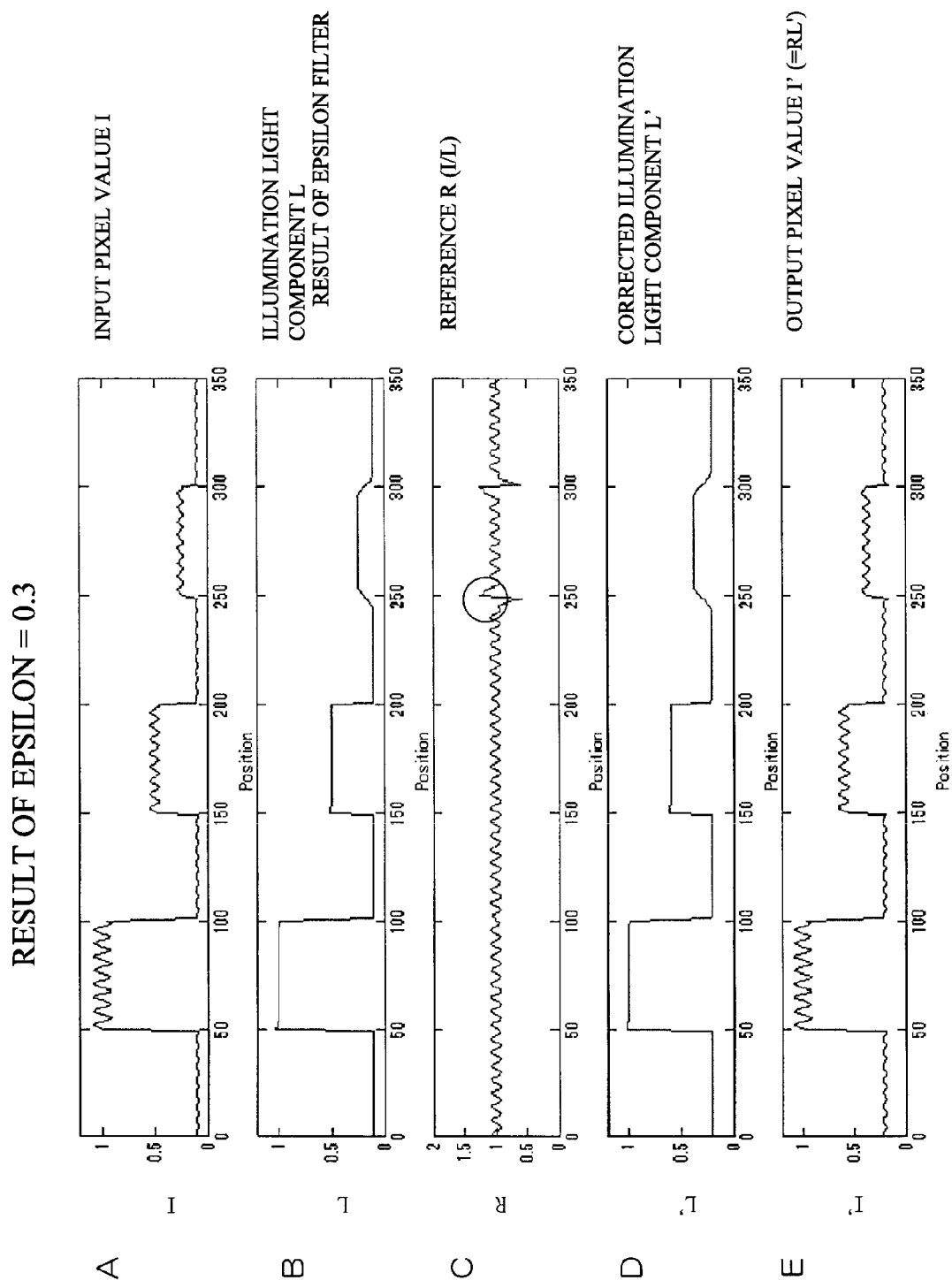
FIG. 5 includes graphs showing input/output data when the threshold $\epsilon$=0.3.

FIG. 5 shows a case where the threshold ϵ is 0.3 (fixed value), which is slightly smaller than that in FIG. 4. As in FIG. 4B, for the illumination light component L, almost all the alternating-current component L is eliminated from the pixel positions 50 to 100, 150 to 200, and 250 to 300. For the reflectance R, as shown in FIG. 5C, no ripples occur in the pixel positions 50 to 100 and 150 to 200, while some ripples occur in the pixel positions 250 to 300.

As seen above, lowering the threshold ϵ allows the luminance difference to be reduced in such a manner that halos are eliminated.

Figure 6:
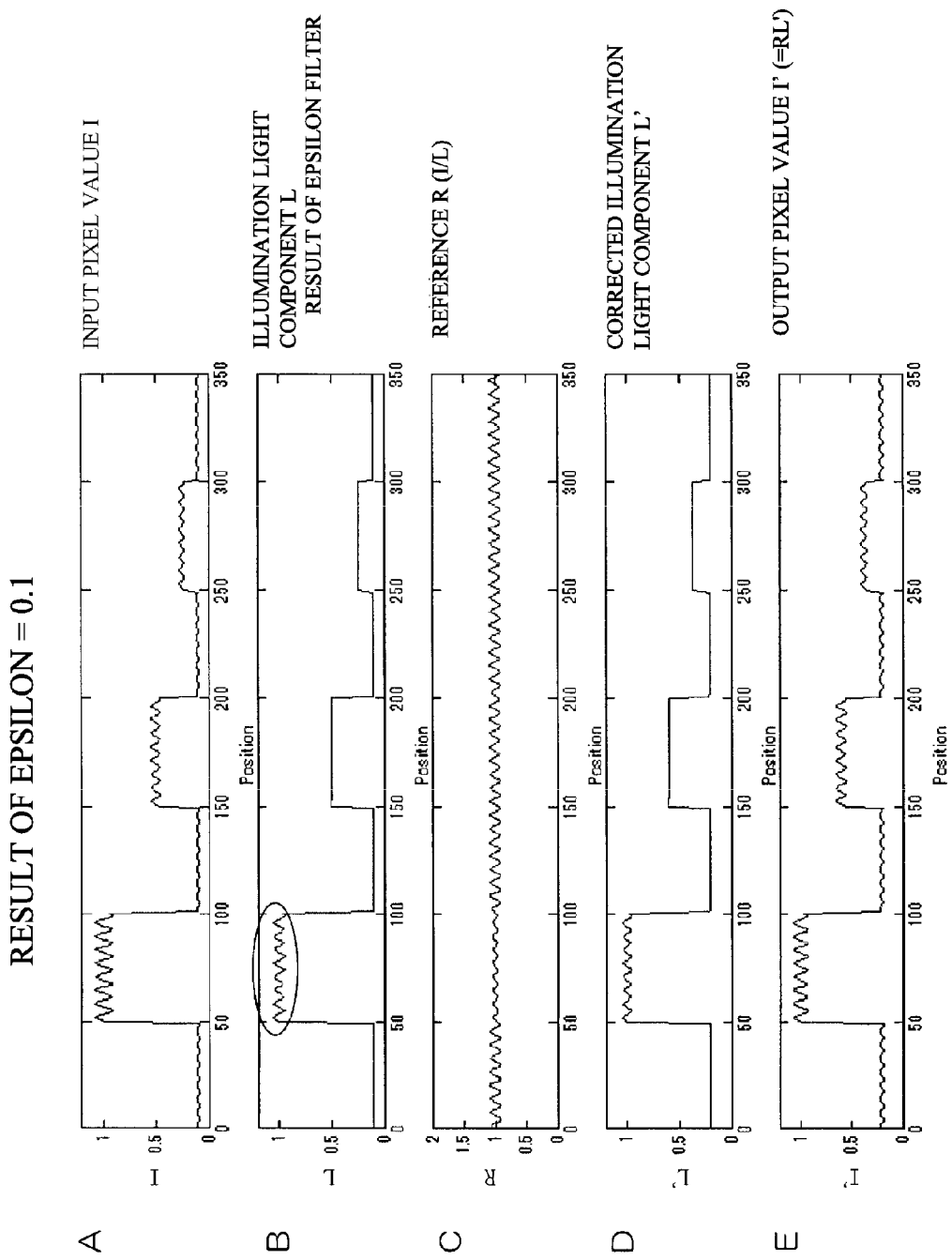
FIG. 6 includes graphs showing input/output data when the threshold $\epsilon$=0.1.

FIG. 6 shows a case where the threshold ϵ is 0.1 (fixed value). For the reflectance R, as shown in FIG. 6C, no ripples exist unlike in FIGS. 4 and 5. For the illumination light component L, however, as shown in FIG. 6B, alternating-current components having large amplitude remain in the pixel positions 50 to 100. As a result, as shown in FIG. 6E, output data is less responsive in the pixel positions 50 to 100, where the luminance value is high and the amplitude is large.

As seen above, when the threshold ϵ is excessively lowered, the original low-pass filter effects are reduced.

Figure 7:
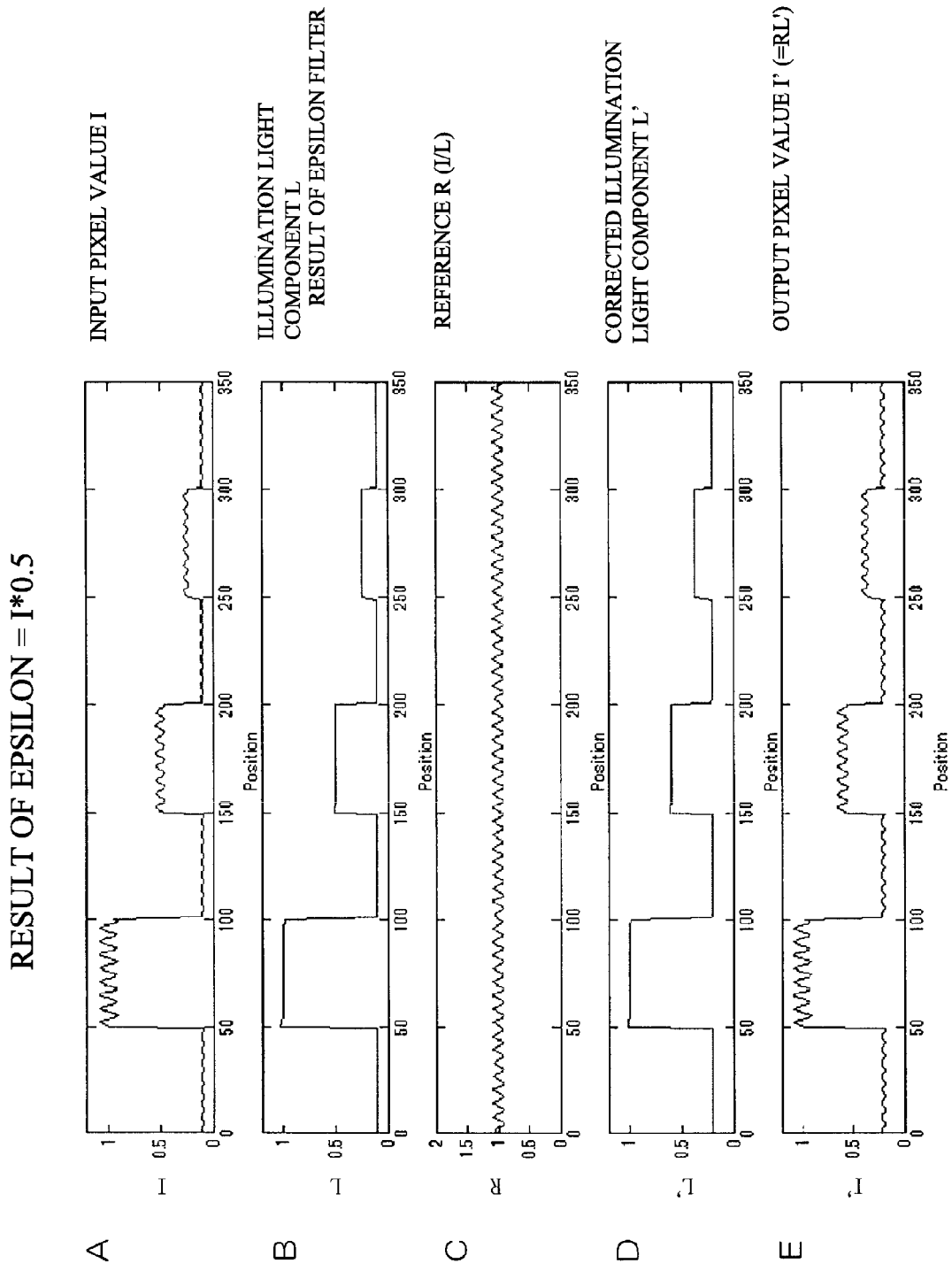
FIG. 7 includes graphs showing input/output data when the threshold $\epsilon$ is changed according to the input image value.

FIG. 7 shows a case where a linear function of the center representative value is expressed as ϵ=0.5*(center pixel value) and where the threshold ϵ is changed. By changing the threshold ϵ in accordance with the center representative value, no ripples occur in the pixel positions 50 to 100, 150 to 200, and 250 to 300. Further, the corrected illumination light component can be separated even from large-amplitude regions, such as the pixel positions 50 to 100. Thus, it is possible to eliminate almost all halo artifacts while maintaining the low-pass filter effects.

Figure 8:
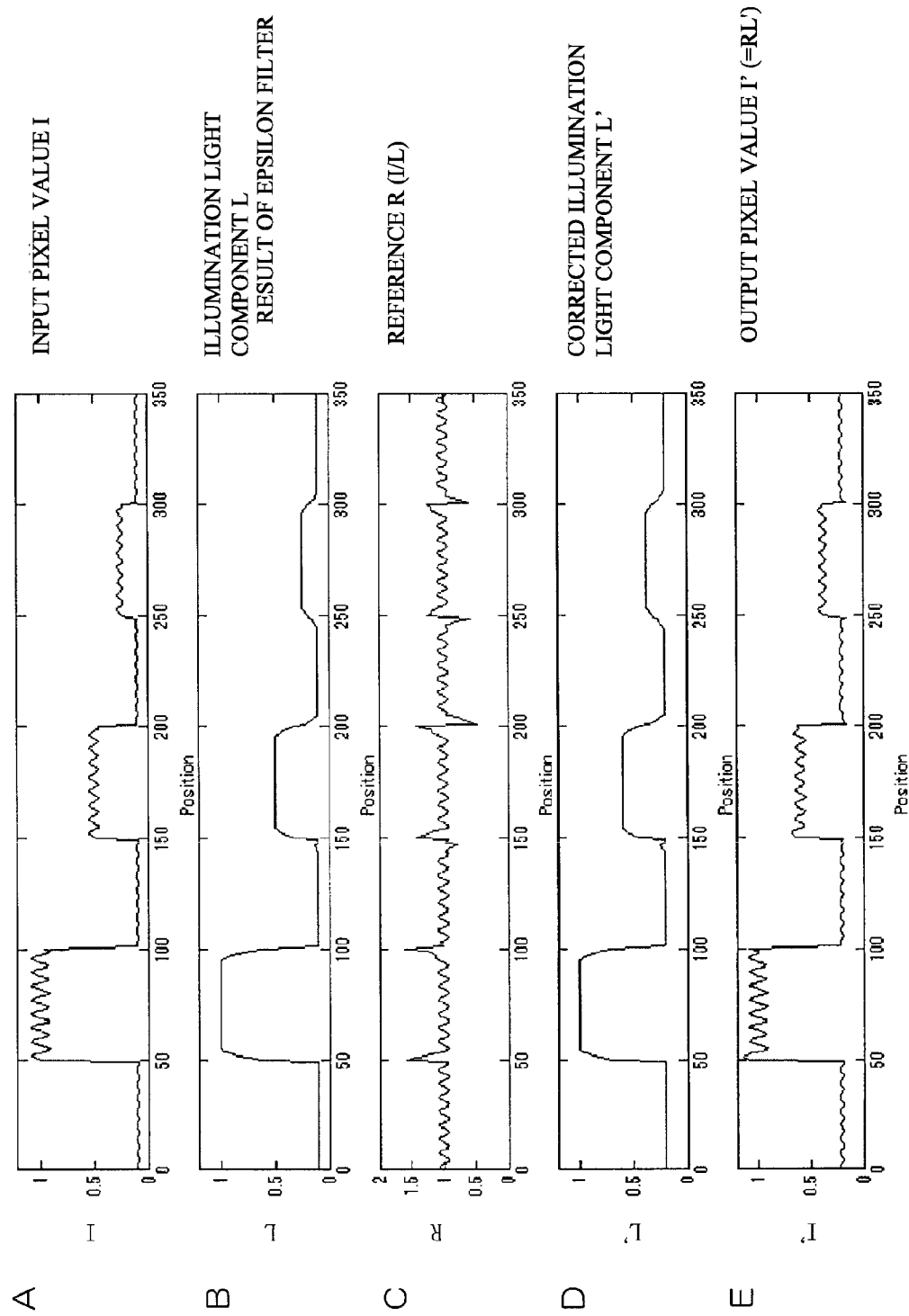
FIG. 8 includes graphs showing input/output data when the threshold $\epsilon$ is changed according to the input image value.

FIG. 8 shows a case where a linear function of the center pixel value is expressed as ϵ=0.7*(center pixel value)+0.3. As shown in FIG. 8C, some ripples occur at the edges of the pixel positions 50 to 100, 150 to 200, and 250 to 300. As a result, as shown in FIG. 8E, some halos occur. However, humans hardly recognize such a few halos, as described above, and stereoscopic vision can be enhanced.

As seen above, in the present embodiment, the threshold ϵ is defined as a monotone increasing function of the center pixel value. Accordingly, it is possible to raise the threshold of the high-luminance region, where even when some halo artifacts exist, humans hardly perceive such a few halo artifacts, and to lower the threshold of the low-luminance region, where humans are likely to perceive halo artifacts.

As described above, by changing the threshold ϵ on the basis of the V value of the center value of the low-pass filter, a different threshold ϵ can be used for each region. Further, the threshold ϵ is changed linearly so that the threshold is raised when the V value of the center pixel of the low-pass filter is increased and the threshold is lowered when the V value is reduced. Thus, the threshold ϵ can be changed according to the technical characteristics of JND.

Further, Formula (1) above is determined in accordance with the allowable number of JND steps (10 JNDs in the present embodiment). Thus, gradations can be corrected in such a manner that reduction of halo artifacts and Retinex processing are in balance. Further, the relationship between the thresholds ϵ and the luminance values corresponding to the unit gradations is expressed as a linear function. Thus, when α=0 and β=1, the epsilon filter serves as a typical Gaussian filter; when α=1 and β=0, it can reduce halo artifacts while maintaining the low-pass filter effects, since the threshold ϵ is dynamically changed in accordance with the luminance value of the center pixel.

As seen above, the values obtained by multiplying the corrected discernible luminance differences by the predetermined coefficient in accordance with the allowable number of JND steps can be used as the thresholds of the epsilon filter corresponding to the unit gradations.

3. Other Embodiments

While the value in HSV color space is used as the pixel value in the above embodiment, the lightness in HLS color space may be used. An RGB value or YUV value may also be used.

While the threshold is changed according to the luminance of the center pixel of the low-pass filter in the above embodiment, not only the luminance of the center pixel but also that of pixels adjacent to the center pixel may be considered. For example, when a low-pass filter having a size corresponding to 20*20 pixels is used, the average value of 3*3 pixels including the center pixel may be used as the center representative value. In this case, the average value may be obtained by weighted averaging where a larger weight is given to a pixel closer to the center. The average value may also be the weighted average of the entire region of the low-pass filter corresponding to 20*20 pixels.

Figure 9:
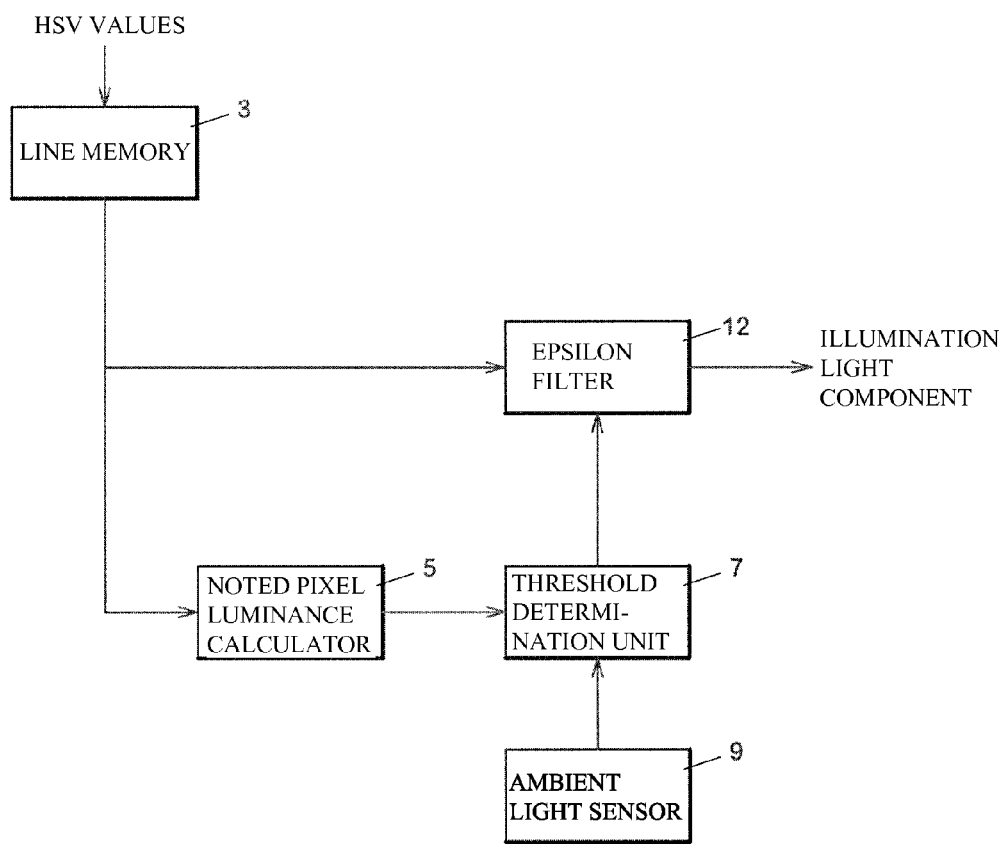
FIG. 9 is a detailed block diagram of the illumination light separation unit 23 when an ambient light sensor is disposed.

In the above embodiment, the maximum and minimum luminance values of the panel, as well as ambient light are estimated, and the correspondences between the assignment luminance values assigned to the pixels and the unit gradations are determined based on the estimated maximum and minimum luminance values and ambient light. That is, Formula (1) above is obtained using the estimated ambient light as a fixed value to determine the threshold $\epsilon$. Alternatively, instead of estimating the ambient light, an ambient light sensor 9 for measuring ambient light, as shown in FIG. 9, may be mounted and then provide measured ambient light to the threshold determination unit 7. Use of the value detected by the ambient light sensor 9 allows dynamic change of the formula representing the relationship between the luminance values corresponding to the unit gradations and the thresholds $\epsilon$.

Figure 3:
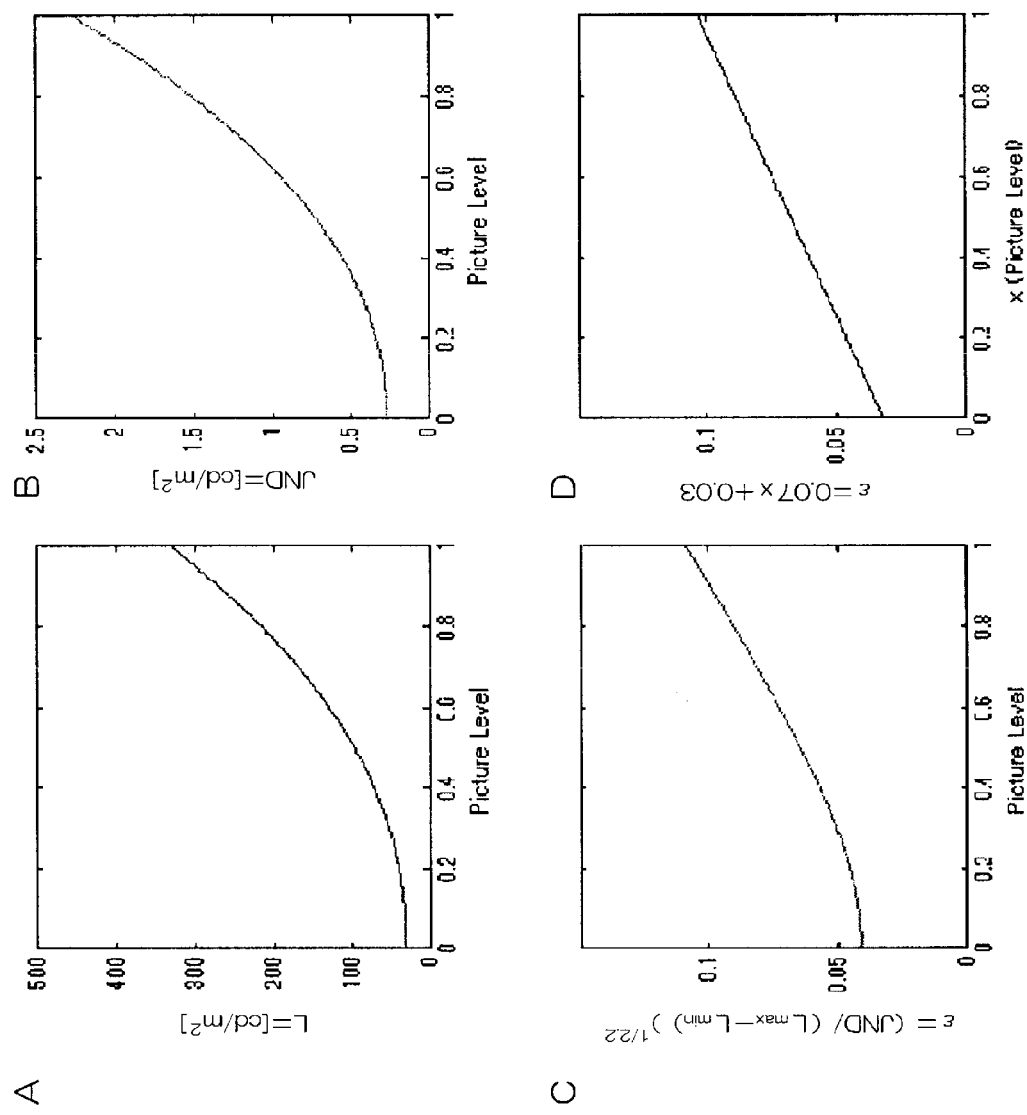
FIG. 3 includes graphs showing the relationship between the JND and the pixel value.

In this case, the calculations in FIG. 3 may be performed each time, or the threshold $\epsilon$ when the ambient light is changed from the minimum estimated value to the maximum estimated value may be previously calculated and stored in a correspondence table and then this table may be referred to.

The units described above may be realized using any of hardware and software.

In the above embodiment, when the correspondences between the assignment luminance values assigned to the pixels and the unit gradations are obtained, the $\gamma$ characteristic is considered; the discernible luminance differences are corrected in such a manner that the $\gamma$-characteristic correction is eliminated; and the correspondences between the corrected discernible luminance differences and the unit gradations are obtained. In this process, JNDI considers the $\gamma$ characteristic, and the correspondence between the particular luminance and a JND has been already obtained as a model. Accordingly, $\gamma$ correction is performed once and then inverse $\gamma$ correction is performed. For this reason, this process is optional.

In the above embodiment, as shown in FIG. 3D, a linear function-based approximate expression is obtained from the relationship between the corrected discernible luminance differences and the luminance values corresponding to the unit gradations, and the $\epsilon$ values determined based on the discernible luminance differences corresponding to the luminance values. Alternatively, instead of such an approximate expression, the relationship shown in FIG. 3C may be used. Specifically, the relationship therebetween may be previously stored in lookup table form and subsequently read. As seen above, the relationship is not limited to that in which the threshold $\epsilon$ is changed linearly and may be that in which $\epsilon$ is a monotone increasing function of luminance corresponding to each unit gradation, as shown in FIG. 3C. In this case, normalization is performed using (Lmax−Lmin) in the above embodiment, other means may be used. This also applies to inverse $\gamma$ correction.

DESCRIPTION OF NUMERALS

3 line memory
5 noted pixel luminance calculator
7 threshold determination unit
9 ambient light sensor
12 epsilon filter

The invention claimed is:

1. A method for correcting gradations in a display device, comprising:
    obtaining, by a noted pixel luminance calculator each assignment luminance value to be assigned to each processing unit gradation, on the basis of the maximum and minimum luminance values of each display device;
    obtaining, by the noted pixel luminance calculator, each discernible luminance difference corresponding to the each assignment luminance value on the basis of data on discernible luminance differences corresponding to luminance values;
    obtaining, by a threshold determiner, thresholds of an epsilon filter such that the thresholds have a monotone increasing relationship with the assignment luminance values, on the basis of the obtained discernible luminance differences; and
    when input image data of a predetermined region is provided to the epsilon filter, correcting, by the epsilon filter, gradations using the threshold of the epsilon filter corresponding to a center representative value of the input image data.

2. The method for correcting gradations of claim 1, wherein the each assignment luminance values is obtained on the basis of the maximum and minimum luminance values, as well as ambient light.

3. The method for correcting gradations of claim 2, wherein a formula representing a relationship between the processing unit gradations and the thresholds of the epsilon filter is dynamically changed based on ambient light detected by ambient light detection means.

4. A device for correcting gradations in a display device, comprising:
    an extractor configured to, when receiving a predetermined region of input image data to be inputted to an epsilon filter, extract a center representative value located around the center of an adjacent pixel region, the center representative value being to be used when the epsilon filter performs a calculation;
    a threshold determiner storing correspondences between the center representative value and the threshold of the epsilon filter and configured to, when receiving the center representative value, determine a corresponding threshold on the basis of the correspondences;
    an epsilon filter configured to smooth the inputted predetermined region of input image data using the threshold determined by the threshold determiner; and
    a gradation corrector configured to correct gradations using an output value of the epsilon filter as an illumination light component.

5. A device for determining a threshold of an epsilon filter, comprising:
    an extractor configured to extract a center representative value located around the center of an adjacent pixel region, the center representative value being to be used when the epsilon filter performs a calculation; and a threshold determiner storing correspondences between the center representative value and the threshold of the epsilon filter and configured to, when receiving the center representative value, determine a corresponding threshold on the basis of the correspondences, wherein the correspondences between the center representative value and the threshold of the epsilon filter represent a monotone increasing relationship determined based on a discernible luminance difference corresponding to a particular luminance value.

6. The device for determining a threshold of an epsilon filter of claim 5, wherein the center representative value is luminance of a center pixel in the adjacent pixel region.

7. The device for determining a threshold of an epsilon filter of claim 5, wherein the correspondences between the center representative value and the threshold of the epsilon filter are represented by a formula $\epsilon=$(center representative value$*\alpha)+\beta$ where $\alpha$ and $\beta$ each represent a decimal fraction between 0 and 1, and the center representative value is normalized to 0 to 1.

8. The device for determining a threshold of an epsilon filter of of claim 5, further comprising an ambient light detector configured to detect ambient light, wherein the threshold determiner stores a plurality of correspondences between the center representative value and the threshold of the epsilon filter, the correspondences corresponding to values of the ambient light, and selects one of the correspondences on the basis of the detected ambient light and outputs a corresponding threshold.

9. A method for determining a threshold of an epsilon filter comprising:

obtaining, by a noted pixel luminance calculator, each discernible luminance difference corresponding to each processing unit gradation with respect to each assignment luminance value assigned to the each processing unit gradation, on the basis of data on discernible luminance differences corresponding to luminance values; and determining, by a threshold determiner, the threshold in such a manner that the threshold has a monotone increasing relationship with a center representative value provided to the epsilon filter, on the basis of the obtained discernible luminance differences.

10. A method for correcting gradations in a display device, comprising:

obtaining, by a noted pixel luminance calculator, each assignment luminance value to be assigned to each processing unit gradation, on the basis of the maximum and minimum luminance values of each display device;

obtaining, by the noted pixel luminance calculator, each discernible luminance difference corresponding to the each obtained assignment luminance value on the basis of data on discernible luminance differences corresponding to luminance values;

obtaining each normalized discernible luminance difference corresponding to the each processing unit gradation by normalizing the obtained discernible luminance differences using a difference between the maximum and minimum values of the display device;

obtaining, by a threshold determiner, thresholds of an epsilon filter corresponding to the respective processing unit gradations on the basis of the normalized discernible luminance differences; and when input image data of a predetermined region is provided to the epsilon filter, correcting, by the epsilon filter, gradations using the threshold of the epsilon filter corresponding to a center representative value of the input image data.

11. A method for determining a threshold of an epsilon filter, comprising:

obtaining, by a noted pixel luminance calculator, each discernible luminance difference corresponding to each assignment luminance value assigned to each unit gradation on the basis of data on luminance differences discernible by humans; and determining, by a threshold determiner, the threshold in such a manner that the threshold have a monotone increasing relationship with a center representative value provided to the epsilon filter, on the basis of the obtained discernible luminance differences.

12. A method for determining a coefficient of an epsilon filter used to separate illumination light, the method comprising:

obtaining, by a noted pixel luminance calculator, each just-noticeable difference (JND) value corresponding to each unit gradation from a range of luminance displayable on a display device, luminance of ambient light, and the number of displayable gradations; and determining, by a threshold determiner, each threshold c of the epsilon filter corresponding to the each unit gradation on the basis of the JND values.

\* \* \* \* \*